United States Patent [19]

Onnenberg et al.

[11] Patent Number: 5,017,114

[45] Date of Patent: May 21, 1991

[54] DEVICE FOR MANUFACTURING FOAM CUSHIONS WITH A COVERING

[75] Inventors: Volker Onnenberg, Wiehl; Günter Möllmann, Hagen, both of Fed. Rep. of Germany

[73] Assignees: Bayer Aktiengesellschaft, Leverkusen; Fritsche Mollmann GmbH & Co., Lotte, both of Fed. Rep. of Germany

[21] Appl. No.: 482,424

[22] Filed: Feb. 20, 1990

Related U.S. Application Data

[63] Continuation-in-part of Ser. No. 269,511, Nov. 10, 1988, abandoned.

[30] Foreign Application Priority Data

Nov. 18, 1987 [DE] Fed. Rep. of Germany ....... 3739257

[51] Int. Cl.⁵ .................... B29C 39/10; B29C 67/20
[52] U.S. Cl. .................... 425/112; 249/93; 264/46.8; 425/117; 425/125; 425/388; 425/DIG. 48
[58] Field of Search ............ 264/45.1, 46.3, 46.4, 264/46.5, 46.6, DIG. 64, DIG. 78; 425/4 R, 817 R, 111, 112, 117, 125, 38, 456, DIG. 48; 249/91, 95; 72/63; 384/50, 54, 125, 566

[56] References Cited

U.S. PATENT DOCUMENTS

| | | | |
|---|---|---|---|
| 2,251,714 | 8/1941 | Onions .................... | 384/566 |
| 3,943,215 | 3/1976 | Grune et al. .................... | 264/46.6 |
| 4,030,871 | 6/1977 | Cobb .................... | 425/388 |
| 4,046,611 | 9/1977 | Sanson .................... | 264/46.6 |
| 4,239,472 | 12/1980 | Atkinson et al. .................... | 425/388 |
| 4,755,117 | 7/1988 | Onnenberg et al. .................... | 425/4 R |
| 4,755,120 | 7/1988 | Onnenberg et al. .................... | 425/125 |
| 4,759,700 | 7/1988 | Onnenberg et al. .................... | 425/4 R |
| 4,806,088 | 2/1989 | Busch et al. .................... | 425/127 |
| 4,808,100 | 2/1989 | Onnenberg et al. .................... | 425/127 |

FOREIGN PATENT DOCUMENTS

| | | |
|---|---|---|
| 8515381 | 7/1985 | Fed. Rep. of Germany . |
| 3633919 | 7/1987 | Fed. Rep. of Germany ..... 264/46.8 |
| 3633922 | 7/1987 | Fed. Rep. of Germany . |

*Primary Examiner*—Jay H. Woo
*Assistant Examiner*—Khanh P. Nguyen
*Attorney, Agent, or Firm*—Joseph C. Gil

[57] ABSTRACT

The present invention is directed to a device for manufacturing foam cushions with coverings. The device broadly includes:

(i) a mold having an upper half and a lower half and having a mix head associated therewith, wherein at least one half of said mold consists of a cavity and a surrounding stretching rim, the inner walls of said cavity having suction channels therein, said suction channels being connected to a vacuum source such that when a vacuum is applied, a covering is sucked into said cavity and against said inner walls, and (ii) a tenter adapted to be placed over said rim, said tenter having
(1) an elastic, flexible roller element rotatably mounted in a groove in said tenter, said roller element being further characterized as
   (a) being capable of twisting around its axis,
   (b) being located in the region of the tenter which comes into contact with said rim, and
   (c) allowing said covering to slide when said covering is being sucked into said cavity.

The device further includes an elastic bearing member which presses down upon said roller element over the full length of said roller element, to thereby press said roller element against said covering.

7 Claims, 1 Drawing Sheet

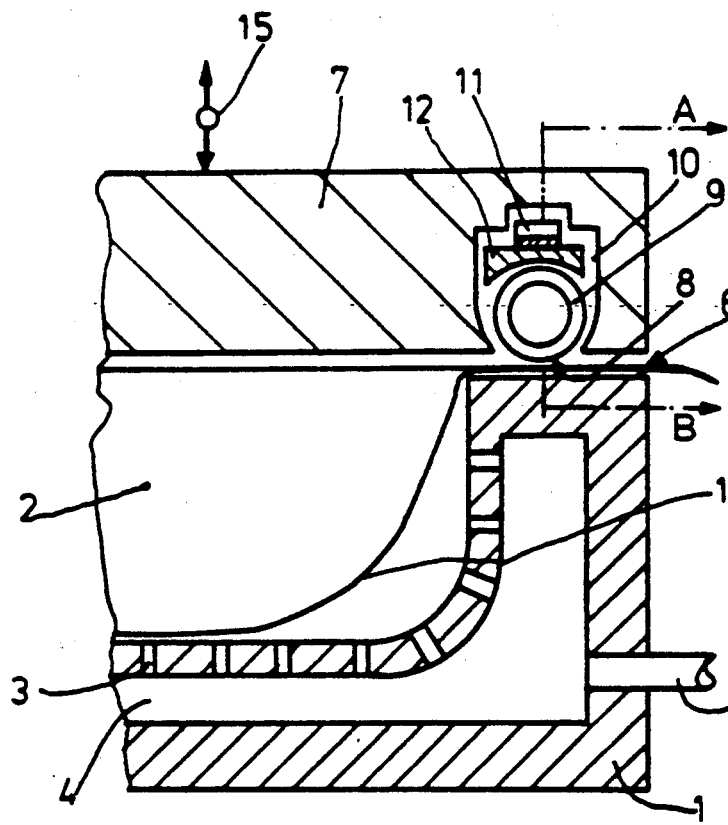
FIG.1
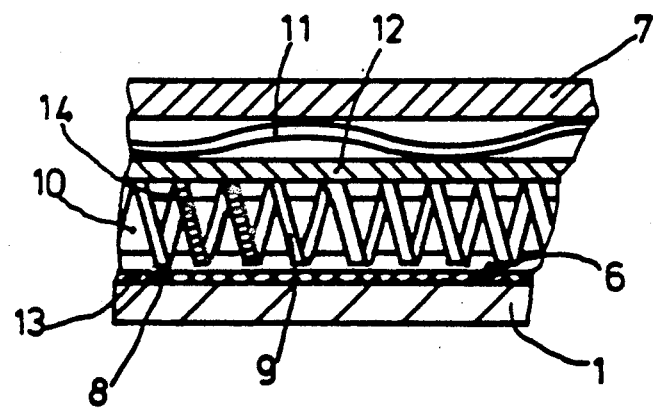
FIG.2 A-B
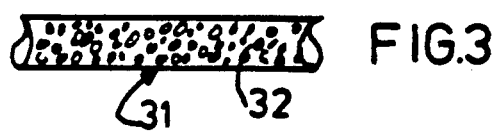
FIG.3
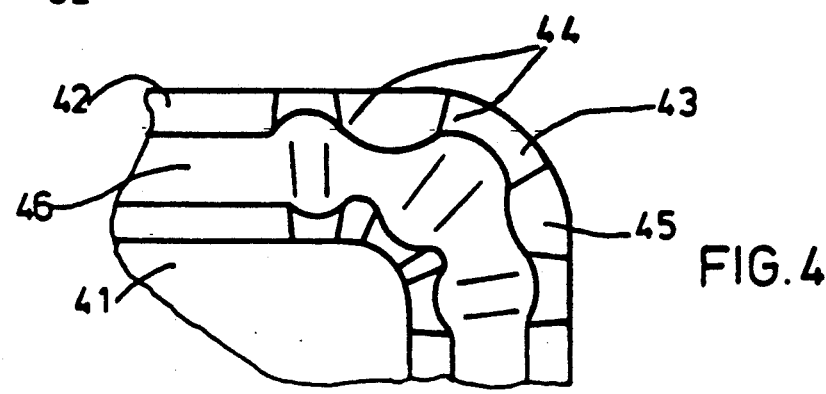
FIG.4

2

DEVICE FOR MANUFACTURING FOAM CUSHIONS WITH A COVERING

CROSS-REFERENCE TO RELATED APPLICATION

This application is a continuation-in-part of U.S. application Ser. No. 269,511, filed on Nov. 10, 1988 now abandoned.

BACKGROUND OF THE INVENTION

The present invention is directed to a device for manufacturing cushions with back-foamed covers, and in particular motor car seat cushions. The device broadly consists of a mold with an associated mix head. One half of the mold consists of a cavity and a stretching rim surrounding the cavity. The inner wall of the cavity is provided with suction channels which are in turn connected to a vacuum source. A tenter (or stretcher) is placed over the cavity and a roller element associated with the tenter presses the covering material against the stretching rim.

Roller elements have already been provided in the form of rollers mounted on axles, in order to have better control over the sliding of the cover material during suction into the mold (see U.S. Pat. No. 3,943,215). One problem with this earlier device is that such rollers cannot adjust to curves and thus may only be used in straight, flat regions of the rim. The geometry of the mold causes the cover material to travel shorter distances at some points, and longer distances at others, during drawing-in. It has turned out that the use of rollers does not sufficiently allow for this.

The problem is in improving the device of the type noted, so that the cover material could slide free of folds, or with reproducible folds at desired places, into the mold cavity.

BRIEF DESCRIPTION OF THE DRAWINGS

FIG. 1 shows a section through an outline of the device,

FIG. 2 shows a section through line A—B in FIG. 1,

FIG. 3 shows a round profile in the form of a rubber strand and

FIG. 4 shows the top view onto a corner of the rim of the mold cavity with round profile indicated thereon.

DESCRIPTION OF THE INVENTION

The above problem is solved in that the roller element consists of an elastically flexible round profile rotatably mounted in a groove arranged in the tenter.

Thanks to its elasticity, such a round profile can adjust itself not only to curves but also twist around itself given appropriate hardness or softness, which is particularly advantageous in regions of various drawing-in paths. With increasing torsion, the braking effect is increased, so that the cover material always remains tautly stretched.

More particularly, the present invention is directed to a device for manufacturing foam cushions with coverings comprising:

(i) a mold having a upper half and a lower half and having a mix head associated therewith, wherein at least one half of said mold consists of a cavity and a surrounding stretching rim, the inner walls of said cavity having suction channels therein, said suction channels being connected to a vacuum source such that when a vacuum is applied, a covering is sucked into said cavity and against said inner walls, and (ii) a tenter adapted to be placed over said rim, said tenter having
 (1) an elastic, flexible roller element rotatably mounted in a groove in said tenter, said roller element being further characterized as
  (a) being capable of twisting around its axis,
  (b) being located in the region of the tenter which comes into contact with said rim, and
  (c) allowing said covering to slide when said covering is being sucked into said cavity, and
 (2) an elastic bearing member which presses down upon said roller element over the full length of said roller element, to thereby cause said roller element to press down upon said covering.

According to the first embodiment, the roller element consists of a coil spring. As an alternative to this, the roller element can consists of a rubber or plastic strand. Depending on the geometry of the mold cavity as well as the composition (in particular the sliding characteristics) of the cover material, one or other variant has its advantages.

The device is also provided with an elastic bearing, member which presses down upon the roller element over the full length of the roller element. This is particularly advantageous if a hard elastic material is chosen for the roller element, as is usually the case with coil springs. Such an elastic bearing can be in the form of corrugated leaf springs.

The roller element is preferably arranged to be exchangeable. The advantage of exchangeability consists in that not only damaged roller elements are exchangeable, but that, for example, furing changing of the type of cover material, a roller element more appropriate to the sliding characteristics of the new cover material (for example, in respect of its elasticity), may be used. Exchangeability may be provided, for example, in that the groove comprises undercuts at its opening in order to keep the groove in the roller element. On the other hand the groove is large enough to be able to remove or insert the roller element, thanks to its deformability. It is of course clear that the groove can have an entry opening at one end, so that the roller element may be pushed in longitudinally.

According to a special embodiment, the roller element consists of individual sections. These sections may be completely separated from each other or formed, for example, by constrictions, which allow greater torsion. Such special designs are helpful in the process of drawing in the cover material for very complicated mold cavity geometries.

According to a further special embodiment the surface of the perimeter of the roller element is provided with a surface structure. This consists for example of lateral ribs. The gripping effect is thereby increased.

In the use of coil springs as roller elements it may be useful in one case or another, depending on the geometry of the mold cavity, if adjacent, separate sections of the coil spring have counter-running turns. As the corners of the mold cavity must form the corners of the seat cushion, and here, as a rule, there is too much cover material present during drawing-in, folds must be deliberately placed at these points. For this reason the stretching rim preferably has fold-forming grooves at the corners of the mold cavity. The roller element is adjusted in respect of its diameter to the contour of the surface of that region.

According to a further special embodiment, a pulsator is assigned to the tenter. This has the advantage that the cover material is periodically grasped and released during drawing-in, according to the frequency of pulsation set.

In FIGS. 1 and 2, the device consists of a mold with associated mix head. The mixing head is not shown, and only the lower mold half 1 is shown. The lower mold half contains a mold cavity 2. This cavity is connected via suction channels 3 to a suction chamber 4, which is connected via a suction main 5 to a vacuum source (not shown). A tenter 7 works against the stretching rim 6 of the mold cavity 2 via the rim 8. This rim 8 includes a roller element 9, which is rotatably mounted in a slightly undercut groove 10. A corrugated leaf spring 11 acts thereon in the direction of pressure of the tenter 7 with a rail 12 placed in between. The roller element 9 consists of a flexible, elastic coil spring. The perimeter surface coming into contact with the cover material 13 is provided with a surface contour 14 in the form of ribs. A pulsator 15 with a frequency of 80 Hz/min acts upon the tenter 7.

A roller element 31 in the form of a foamed rubber strand is represented in FIG. 3, in which the pores represent the surface structure 32.

In FIG. 4, the rim 42 surrounding the mold cavity 41 is provided with fold-forming grooves 44, between which bumps 45 are located. The highly elastic roller element 46 in the form of a rubber strand is adjusted to the rim 42 in this region of the surface contour in respect of its height, and can rotate in spite of the rectangular arc, thanks to its elasticity.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A device for manufacturing foam cushions with coverings comprising:
   (i) a mold having an upper half and a lower half, wherein at least one half of said mold consists of a cavity and a surrounding stretching rim, the inner walls of said cavity having suction channels therein, said suction channels being connected to a vacuum source such that when a vacuum is applied, a covering is sucked into said cavity and against said inner walls, and
   (ii) a tenter adapted to be placed over said rim, said tenter having
      (1) an elastic, flexible roller element rotatably mounted in a groove in said tenter, said roller element
         (a) being capable of twisting around its axis,
         (b) being located in the region of the tenter which comes into contact with said rim, and
         (c) allowing said covering to slide when said covering is being sucked into said cavity, and
      (2) an elastic bearing member which presses down upon said roller element over the full length of said roller element, to thereby press said roller element against said covering.

2. The device of claim 1, wherein said roller element consists of a coil spring.

3. The device of claim 2, wherein adjacent, separate sections of the coil spring comprise counter-running turns.

4. The device of claim 1, wherein said roller element consists of a rubber or plastic strand.

5. The device of claim 1, wherein said roller element is removable.

6. The device of claim 1, wherein said roller element consists of separate sections.

7. The device of claim 1, wherein a pulsator is associated with said tenter.

* * * * *